United States Patent [19]

Hollewed et al.

[11] Patent Number: 4,881,254

[45] Date of Patent: Nov. 14, 1989

[54] HAND-HELD PAY TELEPHONE AND HOLDER

[75] Inventors: Edward J. Hollewed, Naperville; John D. Goeken, Plainfield; Jerome L. Oldani, Aurora, all of Ill.

[73] Assignee: GTE Mobilnet Incorporated, Houston, Tex.

[21] Appl. No.: 138,172

[22] Filed: Dec. 28, 1987

[51] Int. Cl.$^4$ .......................................... H01M 11/00
[52] U.S. Cl. ..................................... 379/144; 235/482
[58] Field of Search ................... 379/58, 457, 90, 433

[56] References Cited

U.S. PATENT DOCUMENTS

| | | | |
|---|---|---|---|
| 4,609,785 | 2/1986 | Drinkard et al. | 379/433 |
| 4,675,903 | 6/1987 | Gulezian et al. | 379/433 |
| 4,677,654 | 6/1987 | Lagin et al. | 379/58 |
| 4,698,838 | 10/1987 | Ishikawa | 379/58 |
| 4,723,281 | 2/1988 | Peiker et al. | 379/433 |
| 4,727,569 | 2/1988 | Kutrieb et al. | 379/58 |
| 4,747,135 | 5/1988 | Banko | 379/436 |
| 4,776,553 | 10/1988 | Kobayashi | 248/558 |

Primary Examiner—Robert Lev

[57] ABSTRACT

For use in conjunction with vehicular, hand-held, pay telephone, a telephone holder and latching mechanism for securing the telephone in the holder and, in response to actuation by a telephone user, releasing the telephone from the holder. The holder includes an elongated holder channel of stepwise construction. The holder channel is enclosed at one end by a butt plate that provides access holes for the telephone line cord and a hook switch. The holder channel is enclosed at an opposite end by a credit-card-actuated latching mechanism. The latching mechanism includes a matching plate that provides a slot aligned with a slot in the holder face plate. A credit card, once inserted into the slots, is guided by a holder box so that the credit card is caused to abut a latch-release plate that is pivotably mounted to the holder channel. Rotation of the latch-release plate about the pivot points withdraws a latch-retainer bracket from a slot in the telephone and permits an ejector mechanism to urge the telephone out of the holder.

37 Claims, 2 Drawing Sheets

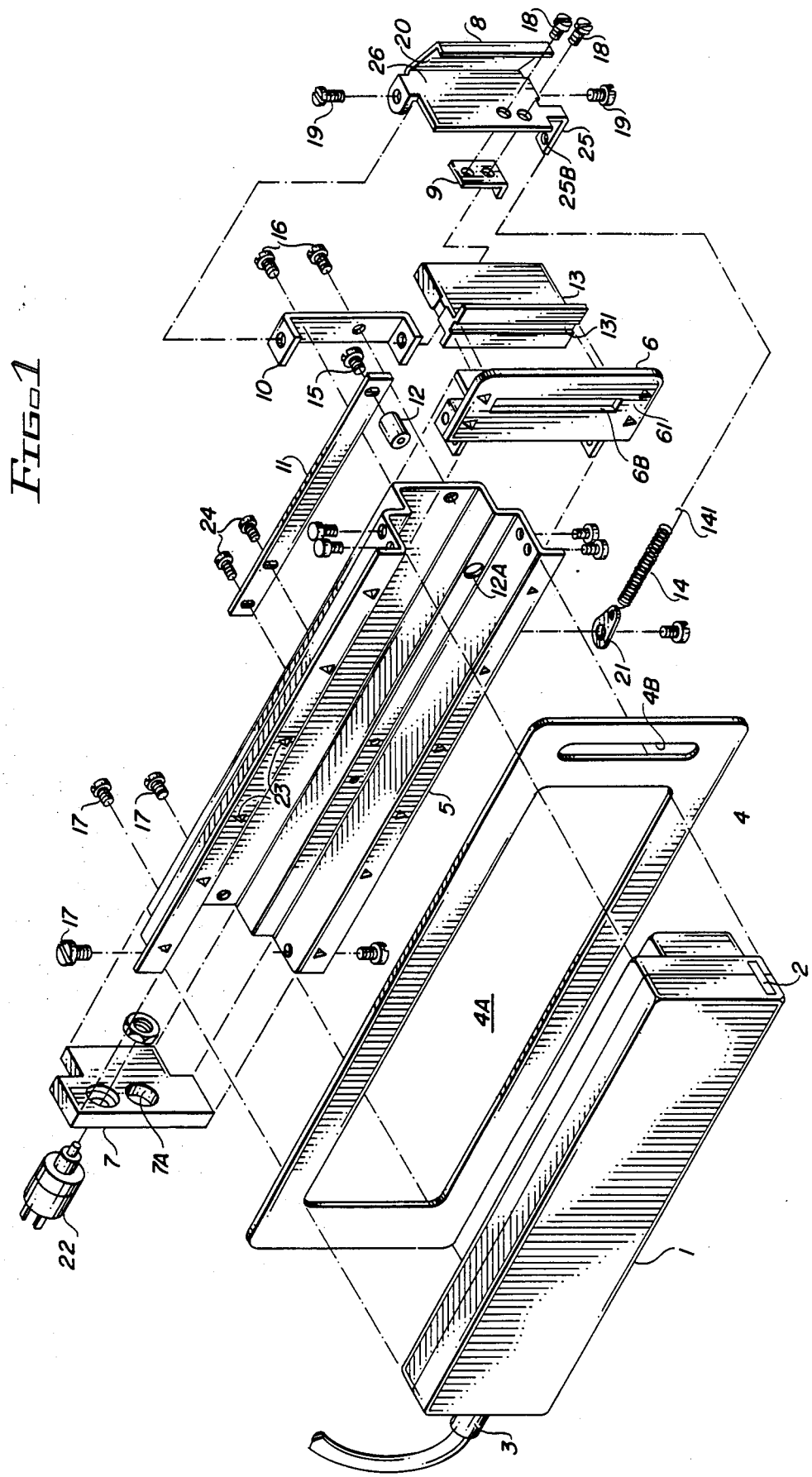

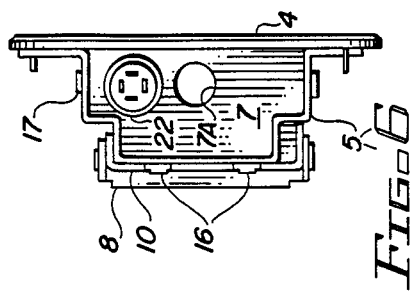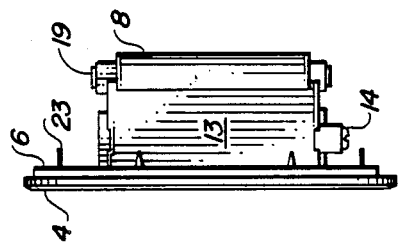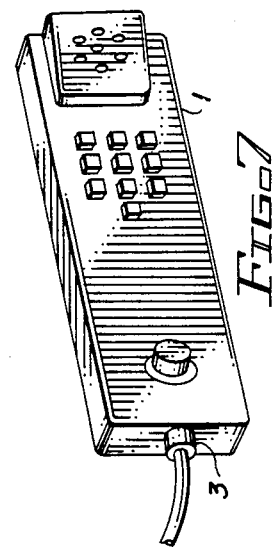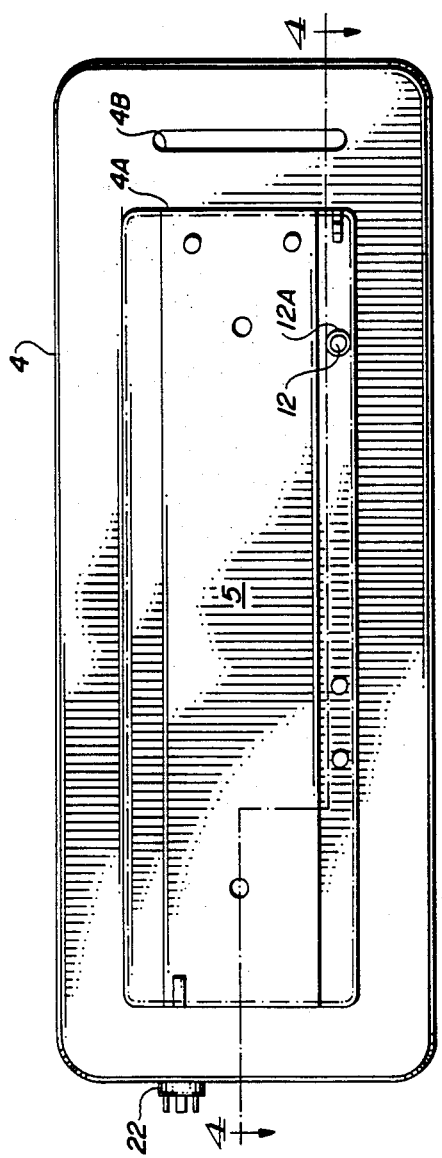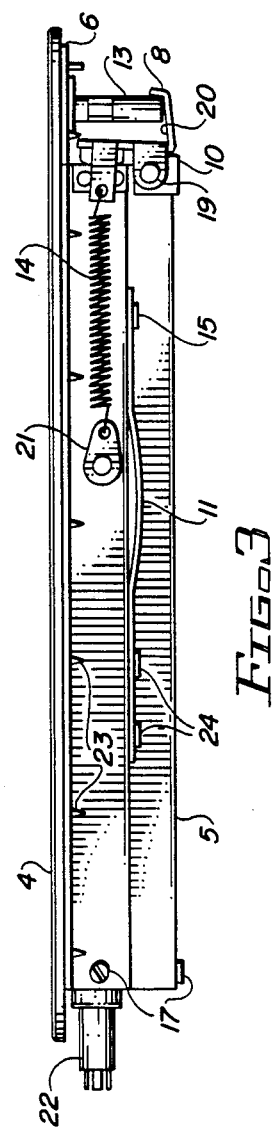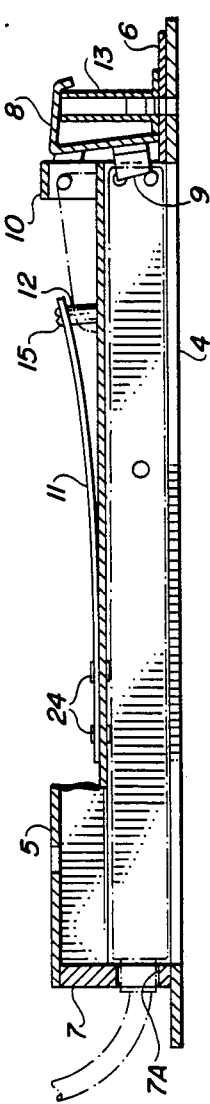

HAND-HELD PAY TELEPHONE AND HOLDER

CROSS REFERENCE TO A RELATED APPLICATION

Cross Reference is made to the related U.S. patent application entitled, "Holder and Credit-Card Unlatching Mechanism for a Hand-Held Telephone," U.S. Ser. No. 138,182 filed on the same date, by the same inventors as this application.

BACKGROUND OF THE INVENTION

1. Field of the Invention

The present invention relates to the field of telephone pay stations and, more particularly, to a telephone pay station adapted for mounting in the passenger area of vehicle.

2. Discussion of the Background Art

Public pay telephones were introduced in the 1880s. In general, operation of such pay telephones required the deposit of a coin in order to unlock some mechanism, for example, the crank with which the user signalled the operator or a sliding door in front of the mouthpiece. On occasion, the entire telephone was enclosed in locked box that could be opened with the deposit of a coin, qua key. One particular arrangement reversed the usual order and enclosed the telephone in a booth having a door that locked behind the user after he had stepped inside the booth. After having made his call, the user could escape only by depositing a coin in the doorlock. Only rarely did the early arrangements provide any means for refunding the user's money in the event that the call could not be completed. An early attempt to remedy this difficulty relied on nothing more than a piece of string.

For many years, the common form of telephone pay station included several slots for the deposit of coins of varying denominations. A typical arrangement allowed the deposit of nickels, dimes and quarters so that payment of various amounts could be utilized in connection with the pay station. This arrangement was first used with so-called manual telephones in which an operator was signalled often by the initial deposit of a single coin. Additional coins were added for payment of calls of longer duration or calls to long-distance locations. Internal arrangements of gongs transmitted various sounds back to the operator and gave the operator an indication of proper coin deposit.

Ultimately, telephone pay stations became dial operated, and an operator would normally not be required in order to place local calls. Various arrangements for actuating the equipment and for accepting and returning coins were developed, including, ultimately, electronic totalizers that were able to count and accurately register the number and denomination of coins deposited. Such totalizers also facilitated the development and utilization of so-called single-slot pay stations, wherein one common slot accepted coins of various denominations, eliminating the traditional three-slot design that had been utilized for many years.

Pay telephones that accept credit cards represent a much more recent development that has found widespread usage within the past decade. Such arrangements, typically found in airports, railroad stations, etc., have been well received by business travelers, largely because credit-card telephones minimize the need for sufficient coins to place telephone calls, particularly long-distance calls.

A degree of experimentation has also been done in connection with the deployment of pay telephones in other than conventional environments. The deployment of telephone pay stations on railroads, particularly on deluxe passenger trains, has been experimented with from time to time. The most recent development and adaptation of the pay station has permitted use in commercial aircraft. Credit-card-accepting pay stations have been incorporated into commercial aircraft where, by means of radio-telephone links, telephone service can be made by the user from the commercial aircraft to ground-based telephone equipment. In the United Sates today, more people use public telephones more often than in any other country in the world, and the subsequent installation and adaptation of public telephones to different environments has been limited only by the imagination.

With regard to the placement of telephone pay stations on board commercial aircraft, the telephones themselves have typically been installed on bulkheads located adjacent to flight-attendant stations This arrangement, however, requires the user to leave his seat to go to the location of the on-board pay station to initiate placement of the call. If the pay station is equipped with a wireless telephone unit, the flight attendant becomes involved in providing the user with the hand-held telephone. Such arrangements fail to afford the convenience, and perhaps the privacy, that an aircraft passenger might desire in connection with the placement of a call from an in-flight aircraft.

Accordingly, it is an object of the present invention to provide a new and more effective telephone pay station for use on board in-flight commercial aircraft or in similar other vehicular environments where convenience of utilization and ready access facilitates and encourages use of such pay telephones.

SUMMARY OF THE INVENTION

The present invention pertains to a holder for a hand-held telephone that is adapted for use as a credit-card-operated pay station and is intended for mounting in an area proximate to a passenger's seat in a commercial aircraft or similar environment. In the specific arrangement that will be discussed herein, the holder for the hand-held telephone is located in passenger. Alternatively, should the passenger be seated adjacent to a bulkhead, the holder could be located in that bulkhead. In the envisioned arrangement, a hand-held telephone which fits flush into the holder of the present invention is located typically directly in front of the passenger. When so located, the telephone provides a constant reminder to the potential user of its availability, as well as its ready access and convenience.

The telephone itself is a one-piece, hand-held unit and includes the usual telephone structures, such as transmitter, receiver, pushbutton calling apparatus. The telephone is connected through a line cord to the on-board telephone system through which communications are established to ground stations and subsequent connection to the switched telephone network. The particular hand-held telephone contemplated by the invention is of the type that may be actuated by use of a credit card. Included specifically is a projection from one end of the telephone which, in the present invention, consists of an integrally molded grommet which surrounds the line cord as it leaves the telephone. The projected grommet engages an opening in the holder so as to aid in the retention of the telephone within the telephone holder. The telephone also includes a recess at an opposite end from the projecting grommet. The recess is adapted to receive a portion of a latch which, in combination with the projection, maintains or retains the telephone within the telephone holder. The external portion of the telephone holder includes a bezel or face plate which is the only portion of the holder visible to the user his seat in the commercial aircraft. Also included in that bezel is a slot adapted to receive a credit card whose purpose will be described later.

The holder is located behind the bezel and includes a telephone-receiving cavity adapted in size and shape to receive the hand-held telephone. The telephone-receiving cavity is formed of a holder channel having a stepped construction. The uppermost or forwardmost portion of the channel is of a width and length commensurate to the width and length of the hand-held telephone.

Included as a feature of the holder channel are a number of pointed projections extending in a rearward direction. The pointed projections are adapted to engage the fabric or similar material employed in the upholstery of seats, bulkheads, etc. in which the holder might be mounted. Because several different techniques may be employed, the specific means of retention of the channel, and, subsequently, the holder, and its location in the rear of the passenger seat aboard a commercial aircraft or any similar arrangement do not represent a limitations of the present invention. What is required is that the entire assembly be rigidly secured, with the cavity portion inside the seat, bulkhead, etc., and that the bezel or face plate is the only visible external portion of the holder arrangement.

Also included as a part of the holder is a butt plate secured at one end of the telephone holder channel. The butt plate includes an opening adapted to receive the projecting grommet from the hand-held telephone and to assist in maintenance of the telephone within the telephone holder. Also included in the butt plate is a telephone hook switch which includes a plunger portion projecting into the cavity and so arranged that when the telephone is in place, the plunger is depressed, disconnecting the telephone from any associated telephone equipment. Upon removal of the telephone from the holder, the plunger, which is spring loaded, moves to its forward or operated position and makes the necessary electrical connection of the included telephone line cord to the on-board telephone equipment.

Located at the other end of the holder channel is a pivotally mounted latch mechanism and a latch retainer bracket. The latch retainer bracket is configured so that, when the latch is in its latched position, the latch retainer bracket extends into the cavity. Conversely, when the telephone is in place, the latch retainer bracket mates with or is received into the recess included in the hand-held telephone. Thus, it can be readily seen that by the cooperative effort of the projection extending into the receiving opening in the butt plate and the latch retaining portion extending into the recess in the telephone, the telephone can be retained within the cavity included in the telephone holder channel of the present invention.

The latch is normally maintained in the closed or latched position by means of an associated coil spring. The coil spring is fastened at one end to a latch mechanism and at the other to a connecting element attached to the external portion of the holder channel. The latch also includes a release portion adapted to be operated in response to the depression of a credit card against the release portion, thereby causing the retaining portion of the latch to be withdrawn from the recess included in the hand-held telephone. To facilitate the placement of the credit card against that release portion of the latch mechanism, the face plate or bezel includes a credit card-sized opening. Directly behind the opening is a credit card matching plate, and, behind that, a credit card holder box. The combination of the opening, the plate and the box channels a credit card after placement by the user in the slot in a forward direction to press against the release portion of the latch mechanism. As indicated, in response to pressure against the release portion, the latch retainer portion is withdrawn from the telephone.

Attached to the holder is an ejector mechanism that consists of a leaf spring and an ejector pin mounted to the rear portion of the holder channel. The ejector pin projects through an opening in the channel holder and abuts the rear of the hand-held telephone. When the latch is released and the retainer portion is withdrawn from the hand-held telephone, the ejector spring forces the ejector pin against the rear of the hand-held telephone, thereby causing the telephone to be pushed forward and out of the telephone cavity so it may be grasped for utilization by a user. At this point, the user can completely withdraw the telephone from the telephone holder and, by means of a credit card, condition the telephone for conventional operation, commencing with the placement of a call, in the usual manner. The ejector spring in the present arrangement is a leaf spring, but other devices, such as a compressed rubber or foam pad or similar device, could also be used to urge the telephone out of the holder in response to the release of the latch mechanism.

BRIEF DESCRIPTION OF THE DRAWINGS

FIG. 1 is an exploded perspective view of a hand-held telephone pay station and its associated holder mechanism in accordance with the present invention.

FIG. 2 is a front plan view of a telephone holder in accordance with the present invention.

FIG. 3 is a bottom plan view of a telephone holder in accordance with the present invention.

FIG. 4 is a sectional view taken along lines 4-4' of FIG. 2 showing, in phantom, a telephone in accordance with the present invention located within the confines of a holder in accordance with the present invention.

FIG. 5 is a right end view of a telephone holder in accordance with the present invention.

FIG. 6 is a left end view of a telephone holder in accordance with the present invention.

FIG. 7 is a perspective view of a hand-held pay station telephone in accordance with the present invention.

DESCRIPTION OF THE PREFERRED EMBODIMENT

Directing attention first to FIG. 1 and to FIG. 7, depicted therein are a hand-held telephone and holder as embodied in the present invention. Telephone 1 is of essentially unitary construction and is intended for hand-held operation. The telephone incorporates the familiar telephone functional components, including a transmitter, a receiver, a calling device and a line matching network. However, inasmuch as these components are not deemed to be constituent elements the present invention, they will not be herein discussed in detail.

Also provided at one end of the telephone, as may be seen in FIG. 1, is a latch-receiving recess 2. At the other end of the telephone, surrounding the associated telephone line cord, is a grommet 3 formed at least in part with the housing or case of telephone 1. Grommet 3 serves as, inter alia, a projection for assistance in maintaining the telephone in the associated holder, as will be described in detail below.

Referring now to FIGS. 1 through 6 inclusive, the holder for the described telephone will now be described in detail. As may be readily seen from the exploded perspective view of FIG. 1, face plate or bezel 4 is the only part of the associated holder that is visible to the telephone user. Face plate 4 is fabricated from a relatively thin plate of metal, plastic, or similar material and exhibits a large, essentially rectangular, central opening 4A having length and width dimensions appropriate for the insertion of telephone 1. The telephone may be inserted through central opening 4A into a telephone-receiving cavity for retention when the telephone is not in use.

Also included in face plate 4 is a second opening or vertical slot 4B dimensioned so as to permit the insertion of a typical credit card. As will be described in detail below, the insertion of a credit card through opening 4B engages and operates a latch release mechanism, thereby facilitating the removal of the telephone from the telephone holder. The face plate 4 is attached to holder channel 5. As may be seen readily by reference to FIG. 1, holder channel 5 is of a stepped construction, with the forwardmost portion of the holder channel dimensioned s as to accept telephone 1. Along the upper and lower edges of the most forwardly projecting portion of holder channel 5 are a plurality of fabric-engaging projections, or teeth, such as those shown as elements 23 in FIG. 1. The fabric-engaging projections extend in a rearward direction and are intended for engaging the fabric or other material used in upholstering the seat of an aircraft or other vehicle in which the holder and telephone may be utilized. The nature of the particular fabric-engaging teeth may be also seen by further reference to FIG. 3.

In accordance with the present invention, the telephone-receiving cavity for telephone 1 is further defined at one end thereof by means of a matching plate 6 that is affixed by rivets 24 to holder channel 5. The matching plate 6 includes a face portion 61 disposed in a plane parallel to the plane of face plate 4 and orthogonal to the direction of holder channel 5. Face portion 61 is adapted to be placed directly behind on end of face plate 4 in such a way that an opening 6B provided by matching plate 6 aligns directly with the credit-card slot, or opening, 4B provided by face plate 4. Fastened to the rear portion of matching plate 6, directly behind opening 6B, is a credit-card holder box or tunnel portion 13 that maintains, in a manner described below, a credit card inserted through opening 4B in proper alignment with a latch release mechanism.

The other end of the telephone-receiving cavity is formed by a butt plate 7 attached to the end of the holder channel 5 opposite the end to which matching plate 6 is fastened. Butt plate 7 is fastened to the channel holder 5 by means of a plurality of attachment screws 17. Included in butt plate 7 is a hook switch 22. Hook switch 22 is spring loaded and is operated to the electrically open or "on-hook" position in response to the placement of a telephone 1 within the telephone-receiving cavity formed by holder channel 5, matching plate 6 and butt plate 7. When the telephone is removed from the telephone-receiving cavity, the spring-loaded hook switch 22 operates to electrically connect the telephone, via the telephone line cord, to the associated telephone equipment. Also included in butt plate 7 is an opening 7A. Opening 7A acts in combination with the projecting grommet 3 to assist in the retention of the telephone 1 within the telephone receiving cavity. Further details or understanding of the butt plate 7 can be had by reference to FIGS. 3, 4, and 6. Matching plate 6 and its structure and function can be best understood by reference to FIGS. 3, 4 and 5.

A latch mounting bracket 10 is fastened to the rear of channel holder 5 by means of mounting screws 16. A latch mechanism 8 is movably mounted to the latch-mounting bracket 10 by means of pivot rivets 19. Latch mechanism 8 is positioned so as to extend over the rear portion of the credit-card holder box or tunnel 13. A latch-retainer bracket 9 is fastened, by virtue of screws 18, to the forward, or principal, portion 26 of latch mechanism 8. As can be readily seen by reference to FIG. 4, latch-retainer bracket 9 extends through an opening in matching plate 6 into the telephone-receiving cavity. When a telephone is positioned in the telephone-receiving cavity, latch-retainer bracket 9 readily engages recess 2 of telephone 1. The latch mechanism 8, including 1 latch-retainer bracket 9, is maintained in the closed or latching position by means of an attached spring 14. Spring 14 is a coil spring and is attached, at one end, to the side of holder channel 5 by means of spring attaching device 21. Spring 14 is attached at another end to latch mechanism 8 by means of a spring-retaining flange 25 that extends integrally from the bottom of latch mechanism 8. Spring retaining flange 25 exhibits a circular aperture 25B for the engagement of a integral hamate extension 141 of spring 14.

Also affixed to the telephone holder is an ejector mechanism that consists of a longitudinal leaf spring 11 secured at one end, as may be seen in FIG. 3, directly to a portion of holder channel 5. At the other end of the ejector spring 11 is an ejector pin 12 which projects through an ejector aperture 12A in the holder channel 5. Ejector pin 12 is of rigid construction and is positioned to abut the rear portion of telephone 1 when the telephone is secured within the cavity.

The telephone holder of the present invention may be installed within an aircraft seat, bulkhead or similar environment, or perhaps in seats such as those included in limousines, boats, trains, and the like. Obviously, the particular technique of mounting the telephone holder, particularly by means of attaching the channel to the surrounding mounting environment, will vary substantially depending upon the particular utilization of the present arrangement. Thus, the specific details of mounting the telephone holder to the surrounding environment will not be discussed in detail, inasmuch as such mounting details may be readily arrived at by a practitioner of ordinary skill equipped with the disclosure herein provided.

A more thorough understanding of the present invention may be had by means of the following description, which shall be offered again in conjunction with the above-described drawings. Particular attention will presently be directed to the manner in which the telephone is placed into the telephone holder, latched and retained in the telephone-receiving cavity, and then released for use by a telephone user.

With the telephone in the user's hand, the line cord will extend from the telephone into the telephone-receiving cavity an will exit the cavity by means of opening 7A in butt plate 7. The user inserts the end of the telephone that includes the line cord into the telephone-receiving cavity by placing the telephone through opening 4A of bezel 4. The line cord will be drawn through by means of an associated cord, or take-up, reel. At this point grommet 3, which extends from one end of telephone 1, is pressed into engagement with opening 7A in butt plate 7. The telephone is then further pressed through the bezel 4 into the cavity formed by the telephone holder channel 5, matching plate 6, and butt plate 7. Adequate pressure of the telephone against spring-loaded latch mechanism 8 will force the retainer bracket 9 into the recess 2 of telephone 1. At this point, the telephone will be engaged by both the projecting grommet 3 and by the latch-retainer bracket 9 inserted into recess 2. The telephone will be thereby retained in the associated telephone holder, ready for subsequent use.

Should a telephone user desire to use the telephone, he would insert a credit card through the opening 4B in bezel 4. Once inserted through opening 4B, the credit card will then pass through the opening 6B in matching plate 6 and be guided in the direction of latch-release plate 20 by the compartment 131 provided by credit-card holder box 13. Progress of the telephone in this direction is impeded by contact with the latch release plate portion 20 of latch mechanism 8. Moderate exertion by the user against the credit card forces the latch release plate back, thereby overcoming the spring tension maintained by spring 14. As a result, latch mechanism 8 is caused to rotate about the pivots 19 and retainer bracket 9 is withdrawn from the telephone-receiving cavity and, specifically, is withdrawn from recess 2 of telephone 1. At this point, ejector pin 12, affixed to ejector spring 11, will be forced in a forward direction through ejector aperture 12A in channel holder 5 against the rear portion of telephone 1, thereby causing a portion of the telephone to be forced forward and to protrude from the telephone holder. The user may now grasp telephone and manually withdraw it from the telephone holder.

By means of a credit-card reader that may be included in the telephone, the user obtains access to the associated telephone system. A pushbutton calling device included in the telephone permits the user to secure a connection with the desired telephone station. The particular details of the operation of the telephone itself to secure the telephone connection do not form a part of the present invention and therefore, will not be described in more elaborate detail.

It will be obvious to those skilled in the art that numerous modifications to the present invention can be made without departing from the spirit of the invention which shall be limited only by the scope of the claims appended hereto.

What is claimed is:

1. In combination:
a hand-held telephone and a telephone holder;
said telephone including a retainer and a latch receiver;
said telephone holder including a telephone receiving cavity, adapted to receive said telephone in response to the manual placement of said telephone within said cavity, a retainer receiver adapted to accept said retainer, a latch operated automatically to engage said latch receiver and in cooperation with said retainer receiver accepting said retainer, maintaining said telephone within said telephone receiving cavity, and a matching plate having an unobstructed opening therein adapted to receive a predetermined implement inserted from the exterior of said telephone holder into said telephone holder to effect movement of said latch and disengagement of said latch receiver so that said telephone may be removed from said telephone holder.

2. The combination as claimed in claim 1, wherein:
said latch receiver comprises a recess in the exterior of said hand-held telephone.

3. The combination as claimed in claim 1, wherein:
said retainer Comprises a projection extending from an exterior surface of said hand-held telephone.

4. The combination as claimed in claim 3, wherein:
said projection extending from said hand-held telephone exterior surface comprises a grommet adapted to surround a line cord extending into said hand-held telephone.

5. The combination as claimed in claim 4, wherein:
said grommet is an integrally molded portion of said hand-held telephone.

6. The combination as claimed in claim 1, wherein:
said telephone receiving cavity included in said telephone holder is formed in part by a holder channel.

7. The combination as claimed in claim 6, wherein:
said holder channel is of stepped construction.

8. The combination as claimed in claim 6, wherein:
said holder channel includes a plurality of fabric-gripping teeth.

9. The combination as claimed in claim 6, wherein:
said telephone receiving cavity included in said telephone holder is further formed by a butt plate extending across a first end of said holder channel.

10. The combination as claimed in claim 9, wherein:
said retainer receiver comprises an opening included in said butt plate and adapted to receive said hand-held telephone retainer within said opening.

11. The combination as claimed in claim 9, wherein:
said butt plate further includes a hook switch mounted in said butt plate, operated in a first mode in response to the placement of said hand-held telephone within said telephone receiving cavity of said telephone holder, and operated in a second mode in response to the removal of said hand-held telephone from within said cavity.

12. The combination as set forth in claim 6, wherein:
said latch is pivotally mounted to said holder channel.

13. The combination as claimed in claim 12, wherein:
said pivotally mounted latch further includes a telephone engaging portion adapted for engagement with said telephone latch receiver.

14. A combination as claimed in claim 13, wherein:
said telephone engaging portion of said pivotally mounted latch extends into said telephone receiving cavity of said telephone holder.

15. The combination as claimed in claim 12, wherein:
the pivotally mounted latch is retained in a latched condition by a spring tension device.

16. The combination as claimed in claim 15, wherein:
said spring tension device comprises a coil spring.

17. The combination as claimed in claim 6, wherein:

said matching plate is positioned adjacent to said holder channel and said opening therein is sized so as to accept a credit card.

18. The combination as claimed in claim 1, wherein: said telephone holder further includes a holder box extending from said matching plate to said latch.

19. The combination as claimed in claim 18, wherein: said holder box is of a size adapted to receive and retain a credit card manually inserted through the opening in said matching plate and to channel said credit card toward said latch.

20. The combination as claimed in claim 1, wherein: said latch includes a latch release plate adapted for operation in response to the manual placement of a credit card against said latch release plate to disengage said latch from said latch receiver.

21. The combination as claimed in claim 6, wherein: there is further included an ejector adapted to urge said hand-held telephone from within said telephone receiving cavity of said telephone holder.

22. The combination as claimed in claim 21, wherein: said ejector comprises resilient means adapted to urge said telephone from within said telephone receiving cavity included in said telephone holder.

23. The combination as claimed in claim 22, wherein: said resilient means further include a rigid portion projecting into said holder channel.

24. The combination as claimed in claim 22, wherein: said resilient means comprise a leaf spring.

25. The combination as claimed in claim 23, wherein: said rigid portion projecting into said holder channel comprises an ejection rod.

26. The combination as claimed in claim 6, wherein: there is further included a face plate affixed to said holder channel and including an opening therein adapted to facilitate the placement of said hand-held telephone through said opening into said telephone receiving cavity of said telephone holder.

27. The combination as claimed in claim 26, wherein: said face plate further includes a slot adapted to facilitate the manual insertion of a credit card therein for placement in contact with said latch.

28. In combination:
a hand-held telephone including a latch receiving recess and a line cord surrounding grommet projecting from said telephone; and
a telephone holder including a telephone receiving cavity formed by a holder channel of stepped construction having at one end thereof a butt plate including an opening adapted to receive said projecting line cord grommet and adjacent thereto a hook switch;
a latch pivotally mounted to said channel including a telephone engaging portion extending into said channel and adapted to project into said telephone recess;
a coil spring attached between said channel and said latch normally retaining said latch in the latched condition and latch release means adapted to be actuated in response to the placement of a credit card against said latch release means to release said latch and thereby remove said projecting telephone engaging portion from said recess in said telephone; and
resilient ejecting means adapted to urge said telephone out of said cavity; and
a face plate on said holder, including a first opening adapted to permit the placement of said telephone into said holder cavity and a second opening adapted to permit the positioning of a credit card against said telephone latch release means.

29. A telecommunications apparatus comprising:
a hand-held telephone having a line cord extending into said telephone, a retainer comprising a projection extending from an exterior surface of said telephone and surrounding said line cord, and a latch receiver;
a telephone holder having a telephone receiving cavity, adapted to receive said telephone in response to the manual placement of said telephone within said cavity, a retainer receiver adapted to accept said retainer, and a latch operated automatically to engage said latch receiver and in cooperation with said retainer receiver accepting said retainer, maintaining said telephone within said telephone receiving cavity.

30. A telecommunications apparatus as claimed in claim 29 wherein said telephone holder additionally comprises a matching plate having an unobstructed opening therein adapted to receive a predetermined implement inserted from the exterior of said telephone holder into said telephone holder to effect movement of said latch and disengagement of said latch receiver so that said telephone may be removed from said telephone holder.

31. A telecommunications apparatus as claimed in claim 30 wherein said opening in said matching plate is configured to accept a credit card.

32. A telecommunications apparatus as claimed in claim 30 wherein said telephone holder additionally comprises a channeling member positioned between said latch and said matching plate opening, said channeling member being of a size adapted to receive and retain a credit card manually inserted through said matching plate opening and to guide said credit card toward said latch.

33. A telecommunications apparatus as claimed in claim 29 wherein:
said telephone projection serves as a grommet for said line cord; and
at least a portion of said projection is an integrally molded portion of said hand-held telephone.

34. A telecommunications apparatus as claimed in claim 29 wherein said telephone receiving cavity of said telephone holder is formed from a channel member having first and second ends, said channel member serving as a boundary for a first portion of said cavity, and said receiving cavity of said telephone holder being additionally formed from a plate which bounds a second portion of said cavity, said plate extending across said first end of said channel member, and said plate having an opening therein for receipt of said telephone retainer.

35. A telecommunications apparatus as claimed in claim 29 additionally comprising a face plate affixed to said telephone holder, said face plate having an opening therein adapted to accommodate the placement of said hand-held telephone through said opening into said telephone receiving cavity of said telephone holder.

36. A telecommunications apparatus as claimed in claim 35 wherein said telephone and said telephone holder are mutually configured so that when said latch engages said latch receiver, said telephone does not extend substantially outward from said face plate, and said telephone holder additionally comprises:
means for urging said telephone out from said telephone receiving cavity to facilitate gripping of said hand-held telephone.

37. A telecommunications apparatus as claimed in claim 29 wherein said telephone holder comprises means for gripping a fabric so that said telephone holder is installable in a seat having a fabric exterior.

* * * * *